March 31, 1942.   S. D. ROWE   2,278,286
CATHEAD SAFETY DEVICE
Filed June 28, 1940
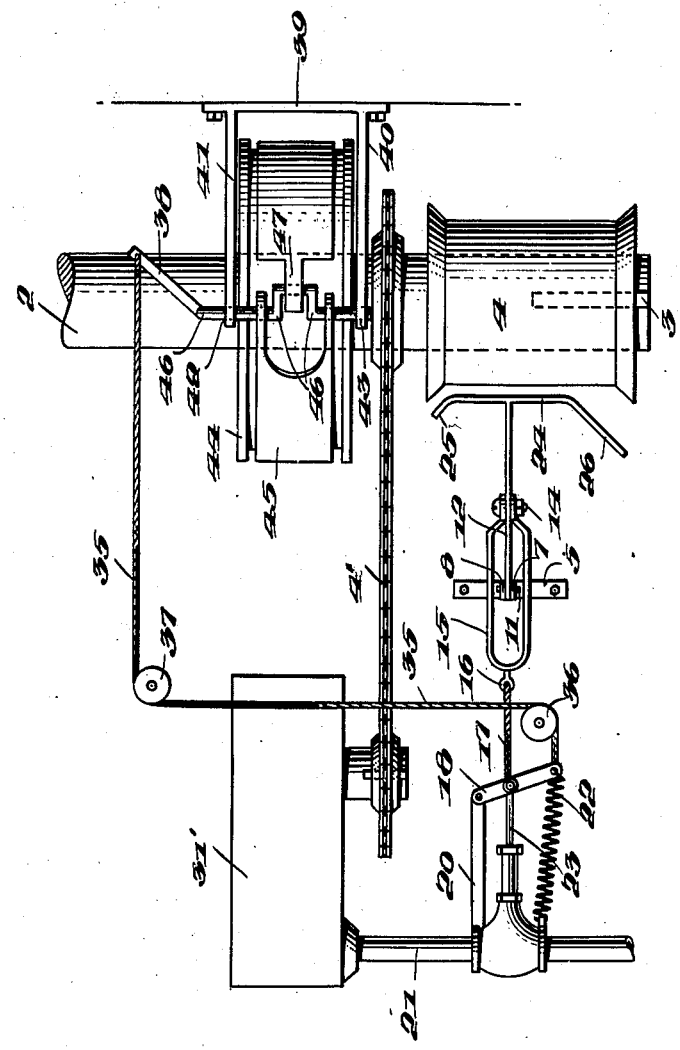
Inventor
S. D. ROWE,
By Mason and Mason.
Attorneys.

Patented Mar. 31, 1942

2,278,286

UNITED STATES PATENT OFFICE 2,278,286

CATHEAD SAFETY DEVICE

Stephen D. Rowe, Wichita Falls, Tex.

Application June 28, 1940, Serial No. 343,041

4 Claims. (Cl. 254—173)

This invention relates to an improvement of the invention described and claimed in my prior issued Patent Number 2,193,010, granted March 12, 1940, for Safety device for catheads.

The principal object of this invention is to provide a means, such as a brake, which is connected in such manner to the operating parts, that the cathead shaft will be immediately stopped and held, whenever an object becomes entangled in the rope which winds around the cathead.

It is another object to provide a brake to stop rotation of the cathead shaft at the same time the power is cut off by the cathead safety device shown and claimed in my prior issued patent.

It is a further object of the invention described and claimed herein to provide a brake for a cathead shaft which utilizes the parts of the power cut off of my patented device, with the addition of a minimum number of additional parts whereby these improvements may be added at slight additional cost, but which is, nevertheless, automatically operated in a positive manner.

Other objects of this invention will appear hereinafter throughout the specification.

In the drawing, the single figure diagrammatically illustrates the invention, in which:

Numeral 4 is a cathead splined by feather 3 to the line shaft 2.

The numeral 5 indicates a suitable support for a pedestal having furcations 7 and 8. A bolt 11 connects said furcations and forms a pivot for the movable arm 12.

The arm 12 is provided with a pivot bolt 14 forming the mounting means for a looped strap member 15, the opposite ends of the loop being supported pivotally by the said bolt 14. An I-shaped member 16 is attached in any suitable manner to the curved end of the strap.

The numeral 17 represents a rope, chain link or other connecting member, one of whose ends is attached to the I-shaped member, and whose opposite end is attached to an operating member 18. In the example here shown, said operating member is pivotally mounted to a fixed support 20 which may be attached to any suitable supporting means, such as a pipe 21. The opposite end of the operating member has attached thereto a spring 22 whose other end may be also attached to a fixed support, such as the pipe 21.

The numeral 31' indicates a suitable source of power such as a steam engine, to which the steam pipe 21 is connected, and this steam engine is adapted to drive in the usual manner the cathead 4 by means of the chain 4'. Attached to the operating member 18, intermediate the length thereof is a stem 23 which is constructed and adapted to operate in such a manner that when said stem is moved to the left, it will cut off the steam in pipe 21 leading to the source of power 31'.

The parts 12 and 15 together with their pivots 14 and 11 form a toggle, and these parts operate in the manner and in fact are identical in construction to correspondingly numbered parts in my patent referred to above, and as described therein. As stated in said patent, when a rope (not shown) which is wrapped around the cathead, becomes doubled on said cathead, or should a man's hand or glove become caught between the outer periphery of the cathead and the rope, this will increase the outer periphery of the cathead as it rotates, and contact of the rope or other object with the cross member or other object will move the same upwardly. This action will break the toggle and allow spring 22 to pull the stem 23 to the left to thereby shut off the power to power source 31'.

The present invention comprises an addition to the above construction and consists, preferably of an operating means, such as the rope 35 having one of its ends attached to the spring attached end of the operating member 18, and its other end attached to a lever 38. The rope passes over guiding sheaves or pulleys 36 and 37.

The lever 38 operates a crank 46 which is mounted to rotate in bearings 42 and 43 of arms 41 and 40 respectively that are connected to support 39.

The numeral 45 indicates a brake strap which surrounds drum 44 that is fast on the cathead shaft 2. The ends of the strap 45 may be connected to the crank 46 as diagrammatically shown in the figure.

It will be noted that the shut off of power from power source 31' and the application of the brake to stop the rotation of the cathead shaft 2, and the cathead 4, are simultaneous operations. These operations occur almost immediately after the happening of an accident, such as the catching of an operator's fingers in the rope which surrounds the cathead 4. Such an occurrence will cause the breaking of the toggle 7, 8, 11, 12 and 15, whereupon the spring 22 will cause a snap action of the operating member 18, which quickly moves in a clockwise direction about the pivot on the support 20. This movement causes the stem 23 to move to the left, and though the flexible member such as the rope 35, pulls the lever 38 to the left to tighten the brake strap about the drum 44 to thus apply the brake and stop rotation of the cathead 4.

It is, of course, within the scope of this invention to use, in place of the cable 35, a system of rods and levers to form the connection between the operating member 18 and the brake strap 45. Any suitable type of brake and brake operating means may be employed.

It is to be further understood that the brake may be applied by the same or similar means which cuts off the power, and that the brake need not be applied to the cathead shaft, but can be installed in any part that turns or drives the cathead.

What I claim is:

1. In a safety device for a rotary cathead, the combination with a source of motive power, a control means for said motive power, a rotary cathead driven by said motive power, a toggle connected to said control means including a member located adjacent to said cathead, another member forming part of said toggle pivotally connected to said first member, and normally in line therewith and connected to said control means, said first member being adapted when actuated to break said toggle and actuate said control means to stop operation of said source of motive power of said rotary cathead, a brake adapted to stop rotation of said rotary cathead, said brake having an operating lever and means having its opposite ends connected directly to said control means and said brake lever for actuating positively said brake whereby operation of said brake and source of motor power are simultaneously controlled.

2. For association with a safety device for a rotary cathead in which said safety device comprises a source of motive power, a rotary cathead driven by said motive power, a control means, biased means tending to operate said control means, and a toggle having pivotally connected members in overlapping relation to each other and normally in line with each other, one of said members having a connection to said control means, and another of said overlapping members having a part thereof located adjacent said cathead, said toggle when broken by operation of said part permitting said biasing means to actuate said control means to stop the operation of the said source of power and said rotary cathead; means operatively connected to said safety device for controlling movement of said cathead comprising a brake, a shaft mounting said cathead and brake and flexible means connected to said control means and brake.

3. In a safety device for a rotary cathead, the combination with a source of motive power, a control means for said motive power, a rotary cathead driven by said motive power, a toggle connected to said control means including a member located adjacent to said cathead, another member forming part of said toggle pivotally connected to said first member, and normally in line therewith and connected to said control means, said first member being adapted when actuated to break said toggle and actuate said control means to stop operation of said source of motive power of said rotary cathead, a brake adapted to stop rotation of said rotary cathead, said brake having an operating lever and means having its opposite ends connected directly to said control means and said brake lever for actuating positively said brake whereby operation of said brake and source of motor power are simultaneously controlled, a shaft on which said rotary cathead is mounted, said brake having a drum, said drum being mounted on said shaft.

4. In a safety device for a rotary cathead, the combination with a source of motive power, a control means for said motive power, a rotary cathead driven by said motive power, a toggle connected to said control means including a member located adjacent to said cathead, another member forming part of said toggle pivotally connected to said first member, and normally in line therewith and connected to said control means, said first member being adapted when actuated to break said toggle and actuate said control means to stop operation of said source of motive power of said rotary cathead, a brake adapted to stop rotation of said rotary cathead, said brake having an operating lever and flexible means having its opposite ends connected directly to said control means and said brake lever for actuating positively said brake whereby operation of said brake and source of motor power are simultaneously controlled.

STEPHEN D. ROWE.